US011454777B2

(12) United States Patent
Peng et al.

(10) Patent No.: US 11,454,777 B2
(45) Date of Patent: Sep. 27, 2022

(54) LENS FIXING MODULE AND PROJECTION DEVICE

(71) Applicant: QISDA CORPORATION, Taoyuan (TW)

(72) Inventors: Wei-Chun Peng, Taoyuan (TW); Po-Chou Chen, Changhua County (TW)

(73) Assignee: Qisda Corporation, Taoyuan (TW)

( * ) Notice: Subject to any disclaimer, the term of this patent is extended or adjusted under 35 U.S.C. 154(b) by 549 days.

(21) Appl. No.: 16/521,561

(22) Filed: Jul. 24, 2019

(65) Prior Publication Data

US 2020/0348484 A1 Nov. 5, 2020

(30) Foreign Application Priority Data

Apr. 30, 2019 (CN) .......................... 201910362884.8

(51) Int. Cl.
*G02B 7/02* (2021.01)
*G03B 21/14* (2006.01)

(52) U.S. Cl.
CPC ........... *G02B 7/026* (2013.01); *G03B 21/145* (2013.01)

(58) Field of Classification Search
CPC .............................. G02B 7/026; G03B 21/145
See application file for complete search history.

(56) References Cited

U.S. PATENT DOCUMENTS

| 5,898,522 A * | 4/1999 | Herpst ................... G02B 7/007 359/511 |
| 7,350,834 B2 | 4/2008 | Ryhman |
| 2005/0121911 A1* | 6/2005 | Ryhman ................. F16L 23/04 285/363 |
| 2007/0009246 A1* | 1/2007 | Lee .......................... G02B 7/04 396/72 |
| 2010/0071122 A1* | 3/2010 | Li .......................... E03C 1/262 4/287 |
| 2014/0298642 A1* | 10/2014 | Sesti ..................... G02B 7/025 29/592.1 |
| 2017/0131514 A1* | 5/2017 | McCreight, Jr. ......... G02B 7/04 |

FOREIGN PATENT DOCUMENTS

| CN | 2665733 Y | 12/2004 |
| CN | 1636117 A | 7/2005 |
| CN | 103217770 A | 7/2013 |
| CN | 205174117 U | 4/2016 |

* cited by examiner

*Primary Examiner* — Ephrem Z Mebrahtu

(57) ABSTRACT

A lens fixing module is configured to fix a lens, wherein the lens has a flange. The lens fixing module includes a fixing base and a fixing ring. The fixing base has a hollow pillar and a first connecting portion. The fixing ring has a restraining portion and a second connecting portion. An end of the lens is inserted into the hollow pillar, the fixing ring is disposed on the lens and the hollow pillar, and the first connecting portion is connected to the second connecting portion, such that the flange is sandwiched in between the restraining portion and the hollow pillar.

12 Claims, 12 Drawing Sheets

LENS FIXING MODULE AND PROJECTION DEVICE

BACKGROUND OF THE INVENTION

1. Field of the Invention

The invention relates to a lens fixing module and a projection device and, more particularly, to a lens fixing module allowing a user to replace a lens rapidly and a projection device equipped with the lens fixing module.

2. Description of the Prior Art

Recently, projectors are getting more and more popular. With the capacity of video playing, projectors are applied not only for common office meetings, but also for various seminars or academic courses. In general, a projector may comprise various optical components including a lens, a light source, an optical engine module and so on, wherein the light source is configured to emit light beam and the light beam is processed by the optical engine module and then projected to form an image through the lens. Accordingly, the lens is an important optical component in the projector. Currently, in some projectors, the lens is replaceable to satisfy different purposes and requirements. However, a mechanism of the conventional projector configured to fix the lens is complicated and a user needs to use other tools to replace the lens.

SUMMARY OF THE INVENTION

An objective of the invention is to provide a lens fixing module allowing a user to replace a lens rapidly and a projection device equipped with the lens fixing module, so as to solve the aforesaid problems.

According to an embodiment of the invention, a lens fixing module is configured to fix a lens, wherein the lens has a flange. The lens fixing module comprises a fixing base and a fixing ring. The fixing base has a hollow pillar and a first connecting portion. The fixing ring has a restraining portion and a second connecting portion. An end of the lens is inserted into the hollow pillar, the fixing ring is disposed on the lens and the hollow pillar, and the first connecting portion is connected to the second connecting portion, such that the flange is sandwiched in between the restraining portion and the hollow pillar.

According to another embodiment of the invention, a projection device comprises a casing, a lens and a lens fixing module. The lens has a flange. The lens fixing module comprises a fixing base and a fixing ring. The fixing base is disposed in the casing and the fixing base has a hollow pillar and a first connecting portion. The fixing ring has a restraining portion and a second connecting portion. An end of the lens is inserted into the hollow pillar, the fixing ring is disposed on the lens and the hollow pillar, and the first connecting portion is connected to the second connecting portion, such that the flange is sandwiched in between the restraining portion and the hollow pillar.

As mentioned in the above, the invention utilizes the lens fixing module to fix the lens by the cooperation between the fixing base and the fixing ring. A user only needs to operate the fixing ring to connect/disconnect the second connecting portion of the fixing ring to/from the first connecting portion of the fixing base, such that the user can replace the lens rapidly. Furthermore, the lens fixing module of the invention can tightly sandwich the flange of the lens in between the restraining portion of the fixing ring and the hollow pillar of the fixing base. Accordingly, the lens fixing module of the invention can support the lens with heavy weight and large size. The lens fixing module of the invention not only can be operated conveniently but also has simple structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
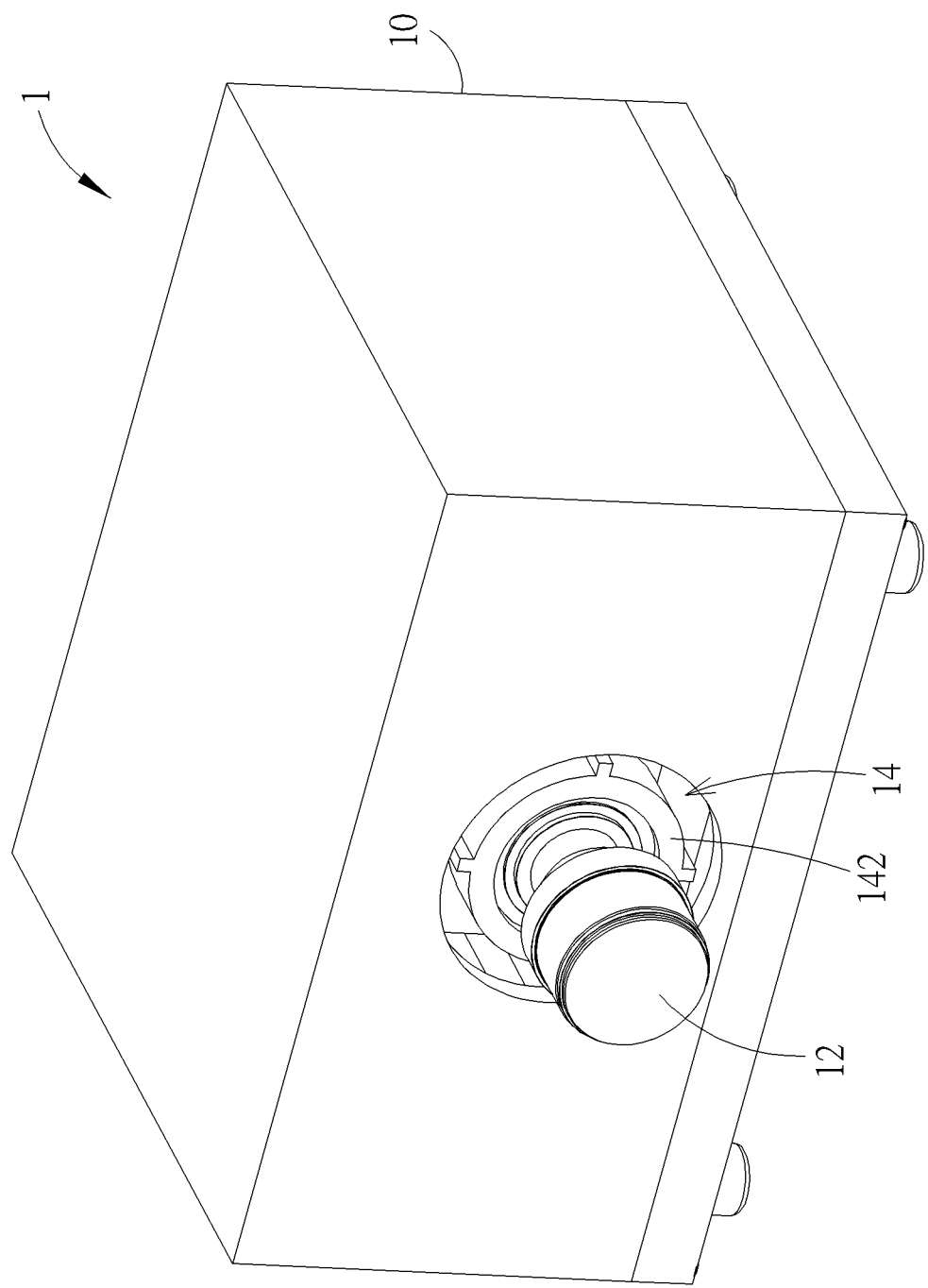
FIG. 1 is a perspective view illustrating a projection device according to an embodiment of the invention.
Figure 2:
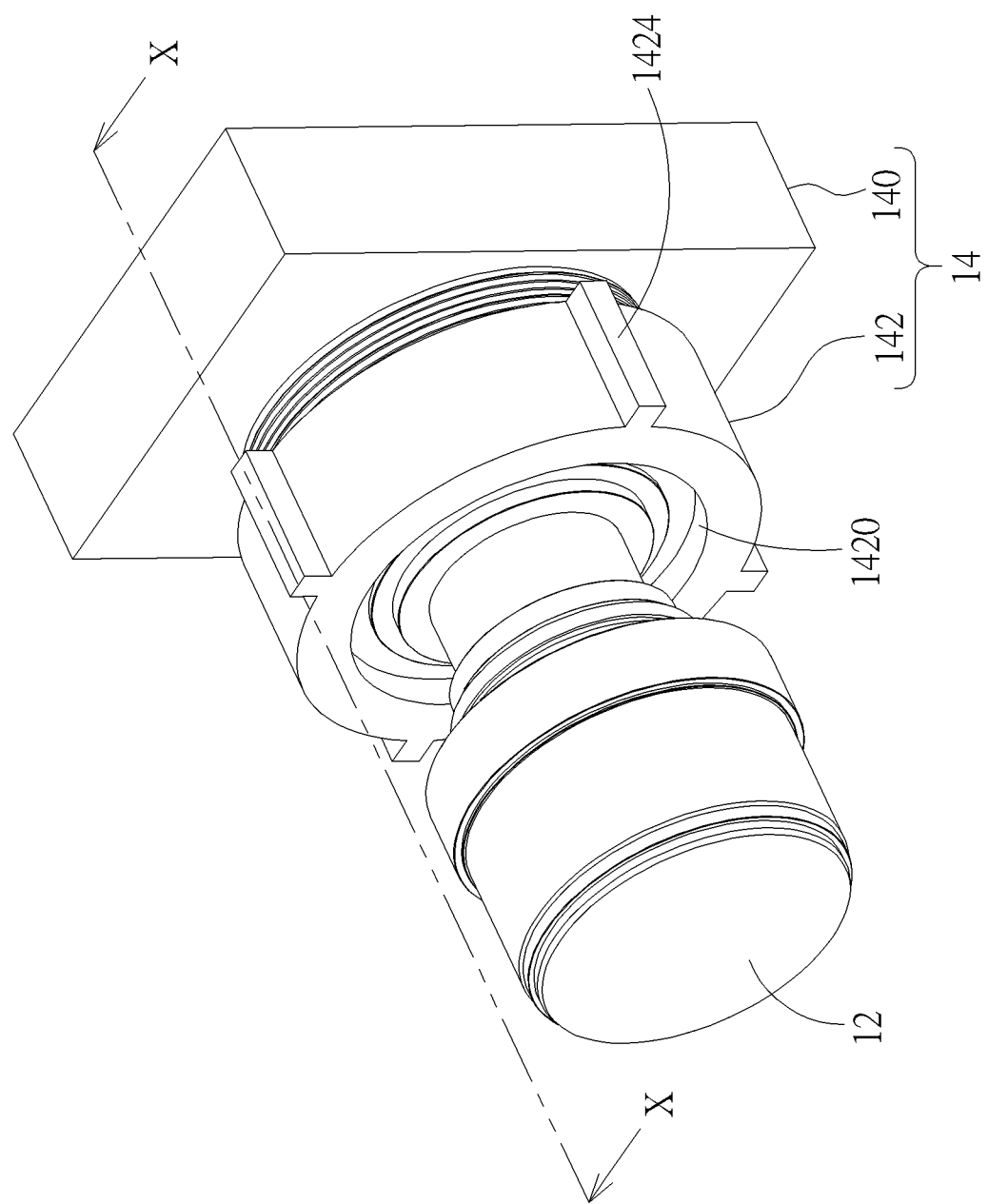
FIG. 2 is a perspective view illustrating the lens and the lens fixing module shown in FIG. 1.
Figure 3:
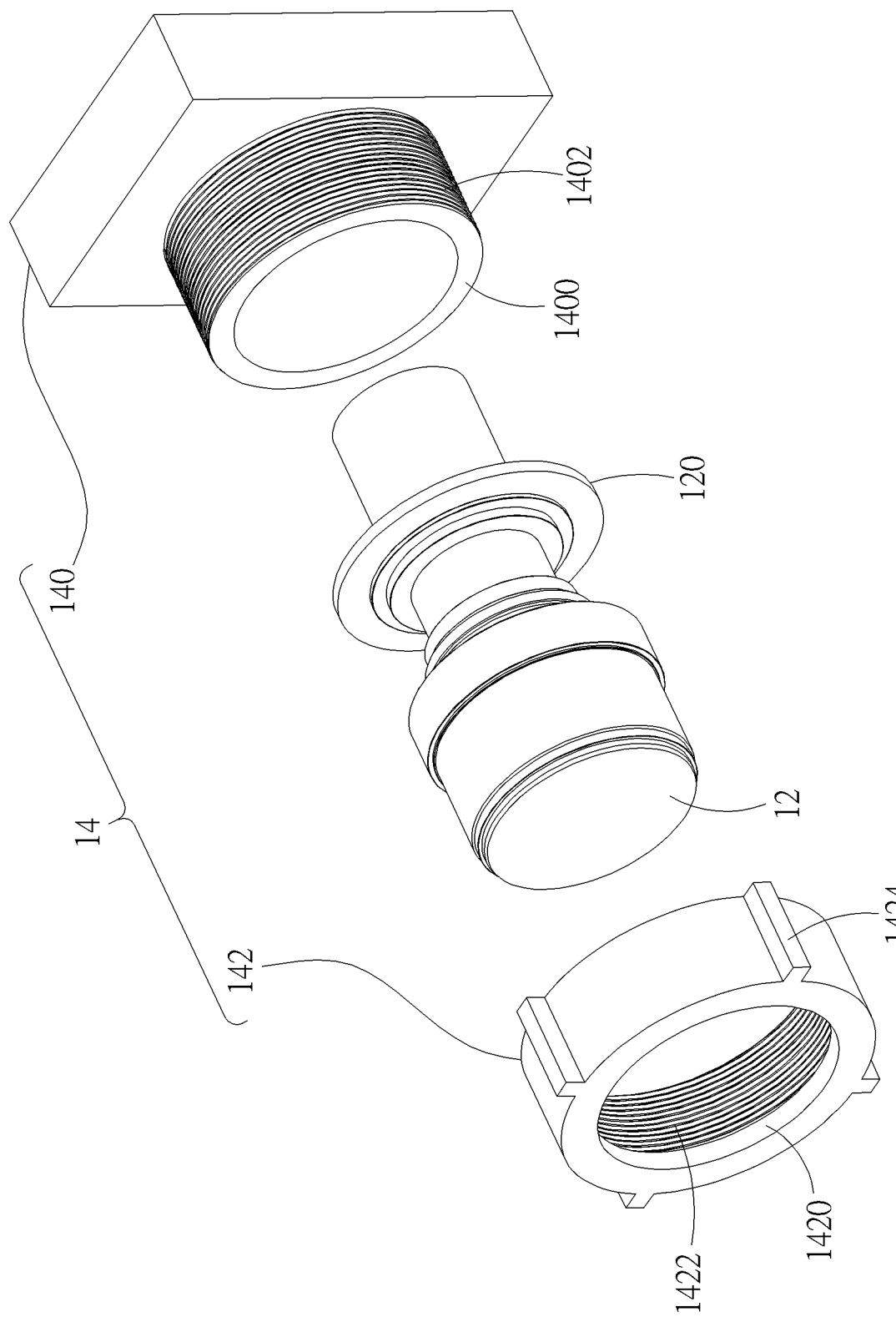
FIG. 3 is an exploded view illustrating the lens and the lens fixing module shown in FIG. 2.
Figure 4:
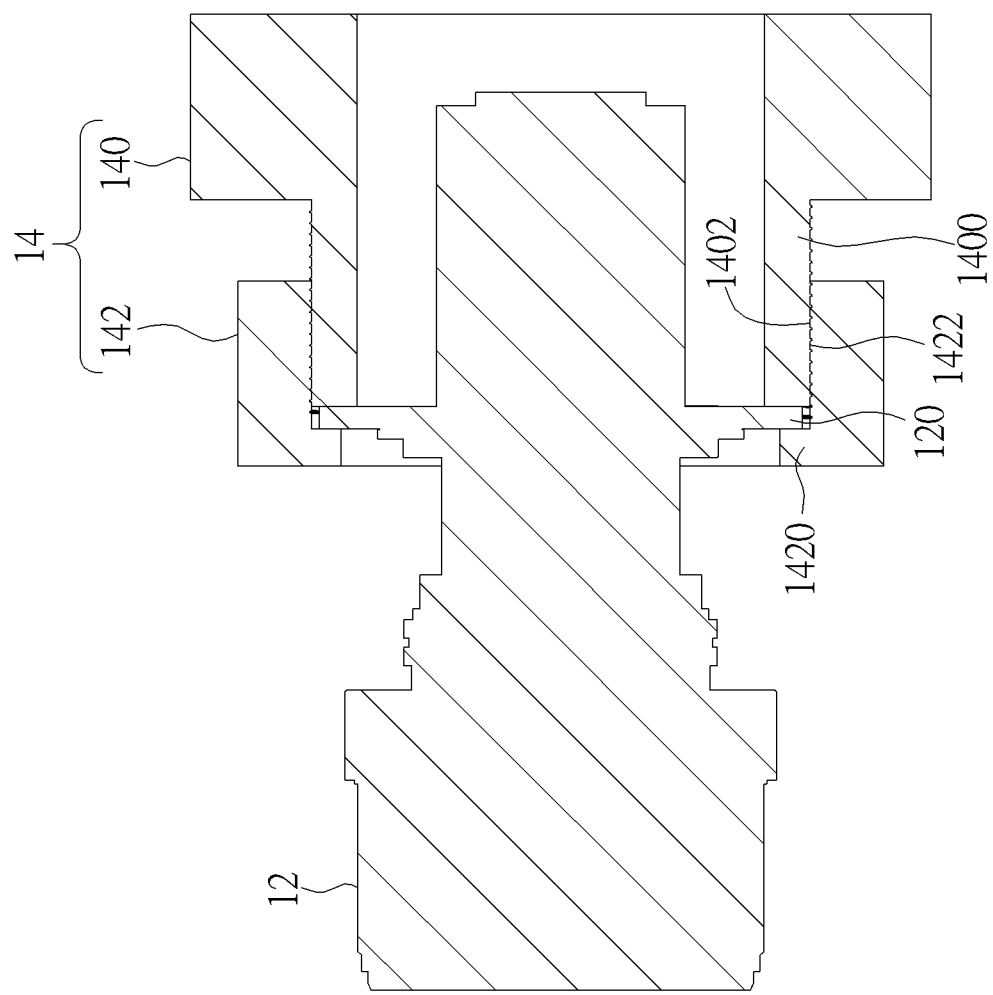
FIG. 4 is a sectional view illustrating the lens and the lens fixing module shown in FIG. 2 along line X-X.

Referring to FIGS. 1 to 4, FIG. 1 is a perspective view illustrating a projection device 1 according to an embodiment of the invention, FIG. 2 is a perspective view illustrating the lens 12 and the lens fixing module 14 shown in FIG. 1, FIG. 3 is an exploded view illustrating the lens 12 and the lens fixing module 14 shown in FIG. 2, and FIG. 4 is a sectional view illustrating the lens 12 and the lens fixing module 14 shown in FIG. 2 along line X-X.

As shown in FIGS. 1 to 4, the projection device 1 comprises a casing 10, a lens 12 and a lens fixing module 14. In this embodiment, the projection device 1 may be, but not limited to, a projector. In another embodiment, the projection device 1 may also be other electronic devices equipped with the lens 12. In general, the projection device 1 may be further equipped with some necessary hardware or software components for specific purposes, such as a controller, a circuit board, a memory, a power supply, applications, a communication module, etc., and it depends on practical applications.

The lens fixing module 14 comprises a fixing base 140 and a fixing ring 142. The fixing base 140 is disposed in the casing 10 and the fixing base 140 has a hollow pillar 1400 and a first connecting portion 1402. In this embodiment, the first connecting portion 1402 may be an outer thread outside the hollow pillar 1400. The fixing ring 142 has a restraining portion 1420 and a second connecting portion 1422. In this embodiment, the second connecting portion 1422 may be an inner thread inside the fixing ring 142. Specifically, the outer thread (i.e. the first connecting portion 1402) is disposed on an outer wall of the hollow pillar 1400 and the inner thread (i.e. the second connecting portion 1422) is disposed on an inner wall of the fixing ring 142.

The lens fixing module 14 is configured to fix the lens 12. In this embodiment, the lens 12 has a flange 120. In this embodiment, the cross sections of the flange 120, the restraining portion 1420, the fixing ring 142 and the hollow pillar 1400 may be circular for assembly purpose. Specifically, an outer diameter of the flange 120 is larger than an inner diameter of the restraining portion 1420 and an inner diameter of the hollow pillar 1400, such that the flange 120 can be sandwiched in between the restraining portion 1420 of the fixing ring 142 and the hollow pillar 1400 of the fixing base 140. When a user wants to fix the lens 12 to the lens fixing module 14, the user may insert an end of the lens 12 into the hollow pillar 1400 of the fixing base 140 first. Then, the user may dispose the fixing ring 142 on the lens 12 and the hollow pillar 1400 in an axial direction of the lens 12. Then, the user may rotate the fixing ring 142 to connect the first connecting portion 1402 of the fixing base 140 to the second connecting portion 1422 of the fixing ring 142, such that the flange 120 of the lens 12 is sandwiched in between the restraining portion 1420 of the fixing ring 142 and the hollow pillar 1400 of the fixing base 140, as shown in FIG. 4. Accordingly, the lens 12 can be fixed on the lens fixing module 14 stably. Since the flange 120 of the lens 12 is tightly sandwiched in between the restraining portion 1420 of the fixing ring 142 and the hollow pillar 1400 of the fixing base 140, the lens fixing module 14 of the invention can support the lens 12 with heavy weight and large size. When the user wants to replace the lens 12, the user may rotate the fixing ring 142 to disconnect the first connecting portion 1402 of the fixing base 140 from the second connecting portion 1422 of the fixing ring 142. Then, the user can detach the fixing ring 142 and the lens 12 from the fixing base 140.

In other words, the user only needs to operate the fixing ring 142 to connect/disconnect the second connecting portion 1422 of the fixing ring 142 to/from the first connecting portion 1402 of the fixing base 140, such that the user can replace the lens 12 rapidly. In this embodiment, the outside of the fixing ring 142 may have at least one protruding portion 1424 or other uneven structures for facilitating the user to rotate the fixing ring 142. Furthermore, the fixing base 140 may be disposed on a movable platform (not shown), so as to adjust a displacement of the lens 12 by the movable platform.

Figure 5:
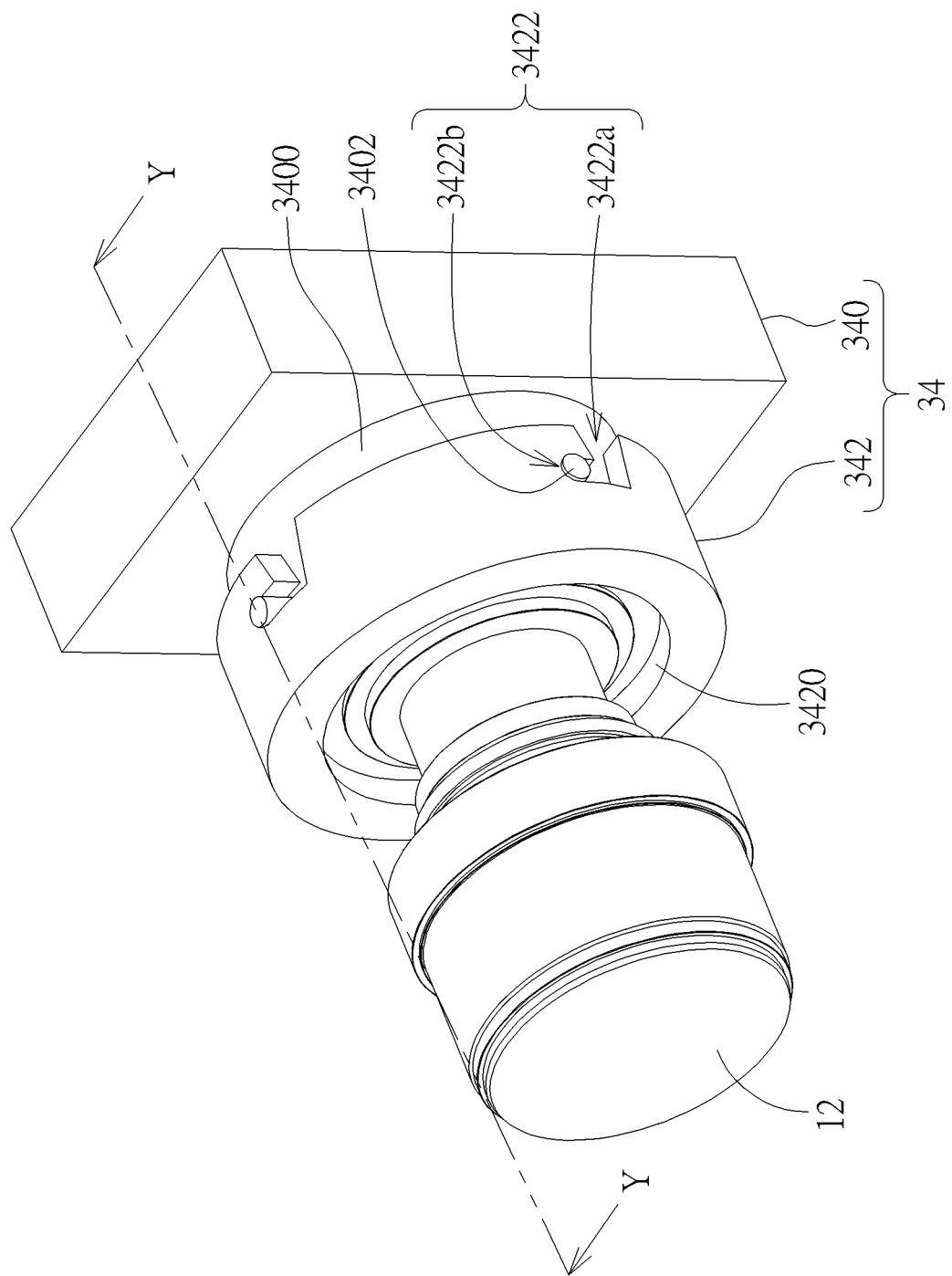
FIG. 5 is a perspective view illustrating a lens and a lens fixing module according to another embodiment of the invention.
Figure 6:
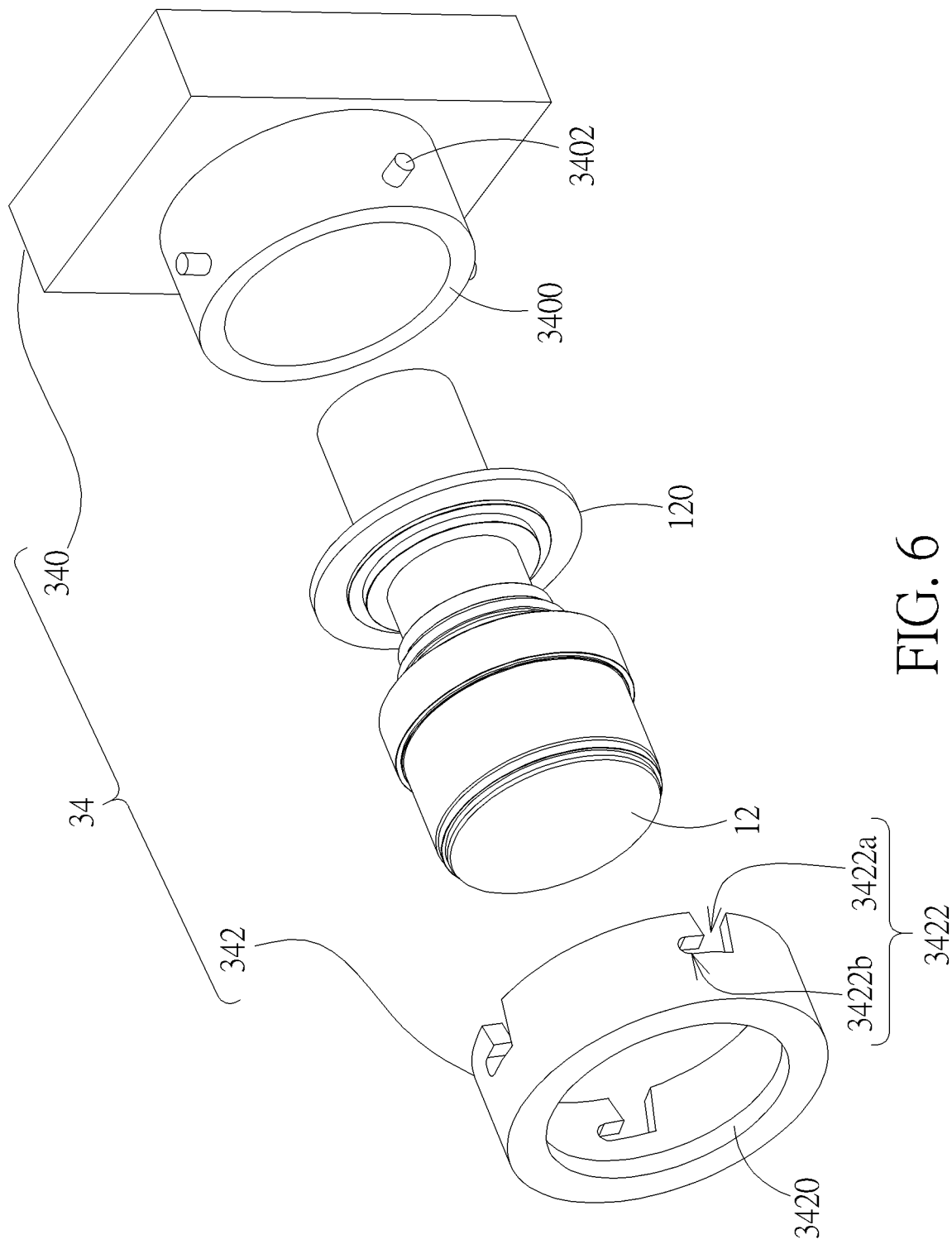
FIG. 6 is an exploded view illustrating the lens and the lens fixing module shown in FIG. 5.
Figure 7:
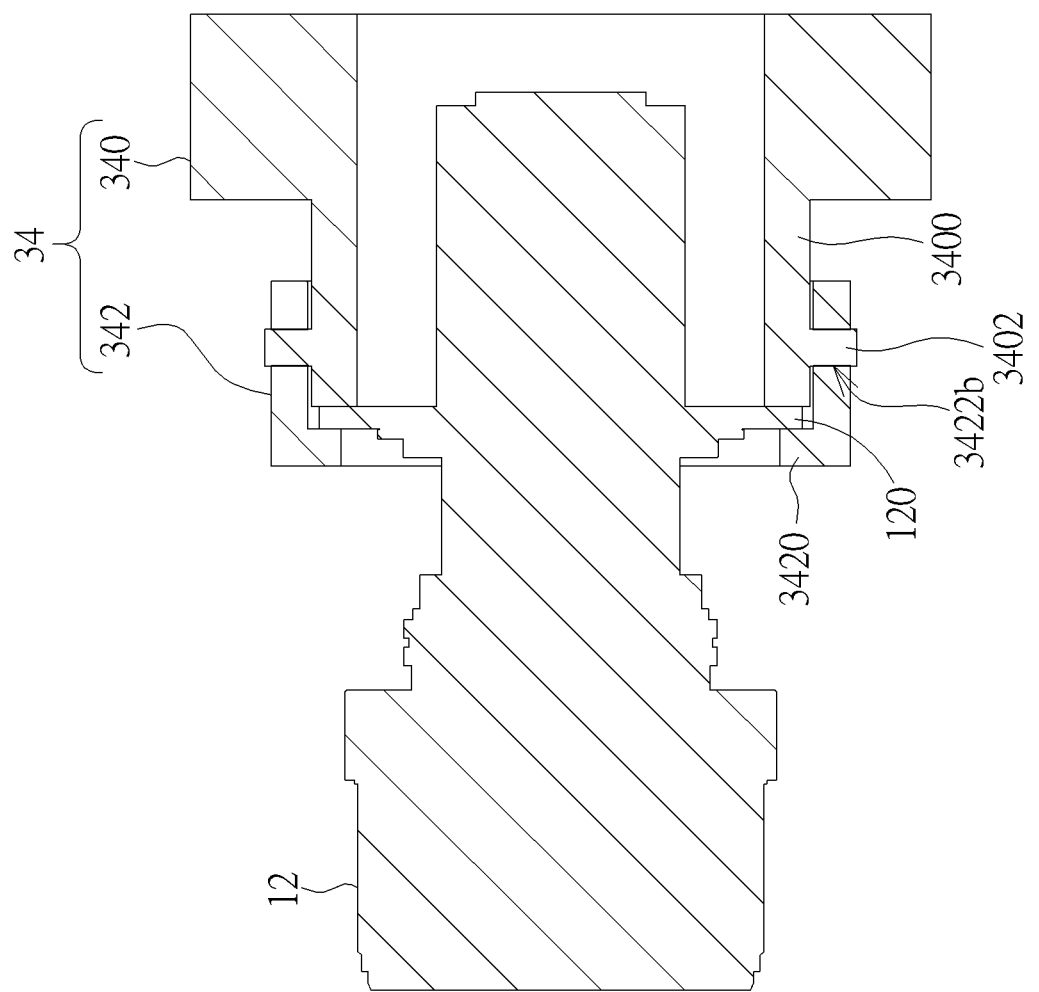
FIG. 7 is a sectional view illustrating the lens and the lens fixing module shown in FIG. 5 along line Y-Y.
Figure 8:
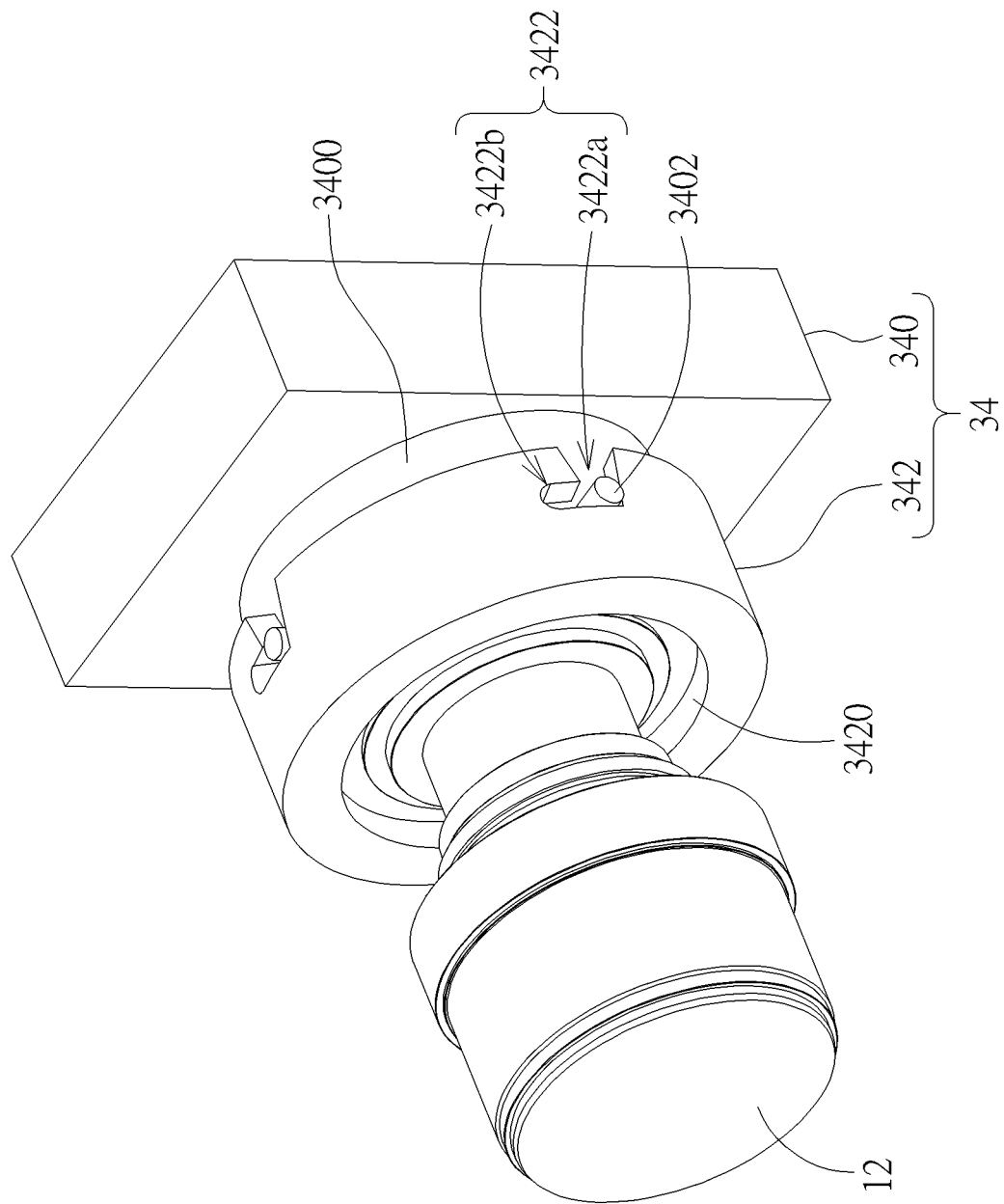
FIG. 8 is a perspective view illustrating the first connecting portion shown in FIG. 5 not entering the engaging recess yet.

Referring to FIGS. 5 to 8, FIG. 5 is a perspective view illustrating a lens 12 and a lens fixing module 34 according to another embodiment of the invention, FIG. 6 is an exploded view illustrating the lens 12 and the lens fixing module 34 shown in FIG. 5, FIG. 7 is a sectional view illustrating the lens 12 and the lens fixing module 34 shown in FIG. 5 along line Y-Y, and FIG. 8 is a perspective view illustrating the first connecting portion 3402 shown in FIG. 5 not entering the engaging recess 3422*b* yet.

As shown in FIGS. 5 to 8, the lens fixing module 34 comprises a fixing base 340 and a fixing ring 342. The lens fixing module 34 may also be configured to fix the aforesaid lens 12. Accordingly, the aforesaid lens fixing module 14 may be replaced by the lens fixing module 34, wherein the fixing base 340 may be disposed in the casing 10 of the aforesaid projection device 1. The fixing base 340 has a hollow pillar 3400 and a first connecting portion 3402. In this embodiment, the first connecting portion 3402 may be a protruding pillar protruded from an outer surface of the hollow pillar 3400. The fixing ring 342 has a restraining portion 3420 and a second connecting portion 3422. In this embodiment, the second connecting portion 3422 may comprise an opening 3422*a* and an engaging recess 3422*b*, wherein the opening 3422*a* communicates with the engaging recess 3422*b*. In this embodiment, the opening 3422*a* and the engaging recess 3422*b* both penetrate a side wall of the fixing ring 342, and the opening 3422*a* is disposed at an edge of the fixing ring 342. Specifically, the opening 3422*a* extends in a first direction, the engaging recess 3422*b* extends in a second direction, and the first direction is not parallel to the second direction. It should be noted that the number of the first connecting portions 3402 and the second connecting portions 3422 may be determined according to practical applications. For example, the fixing base 340 may have a plurality of first connecting portions 3402 arranged symmetrically and the fixing ring 342 may have a plurality of second connecting portions 3422 arranged symmetrically. Furthermore, a position of the first connecting portion 3402 corresponds to a position of the second connecting portion 3422.

When a user wants to fix the lens 12 to the lens fixing module 34, the user may insert an end of the lens 12 into the hollow pillar 3400 of the fixing base 340 first. Then, the user may dispose the fixing ring 342 on the lens 12 and the hollow pillar 3400 in an axial direction of the lens 12, such that the first connecting portion 3402 (i.e. the protruding pillar) passes through the opening 3422*a* of the second connecting portion 3422, as shown in FIG. 8. Then, the user may rotate the fixing ring 342 to make the first connecting portion 3402 (i.e. the protruding pillar) enter the engaging recess 3422*b* of the second connecting portion 3422. At this time, the first connecting portion 3402 of the fixing base 340 is connected to the second connecting portion 3422 of the fixing ring 342, such that the flange 120 of the lens 12 is sandwiched in between the restraining portion 3420 of the fixing ring 342 and the hollow pillar 3400 of the fixing base 340, as shown in FIG. 7. Accordingly, the lens 12 can be fixed on the lens fixing module 34 stably. Since the flange 120 of the lens 12 is tightly sandwiched in between the restraining portion 3420 of the fixing ring 342 and the hollow pillar 3400 of the fixing base 340, the lens fixing module 34 of the invention can support the lens 12 with heavy weight and large size. When the user wants to replace the lens 12, the user may rotate the fixing ring 342 to make the first connecting portion 3402 (i.e. the protruding pillar) exit from the engaging recess 3422*b* of the second connecting portion 3422. Then, the user can detach the fixing ring 342 and the lens 12 from the fixing base 340.

In other words, the user only needs to operate the fixing ring 342 to connect/disconnect the second connecting portion 3422 of the fixing ring 342 to/from the first connecting portion 3402 of the fixing base 340, such that the user can replace the lens 12 rapidly. Furthermore, the fixing base 340 may be disposed on a movable platform (not shown), so as to adjust a displacement of the lens 12 by the movable platform.

Figure 9:
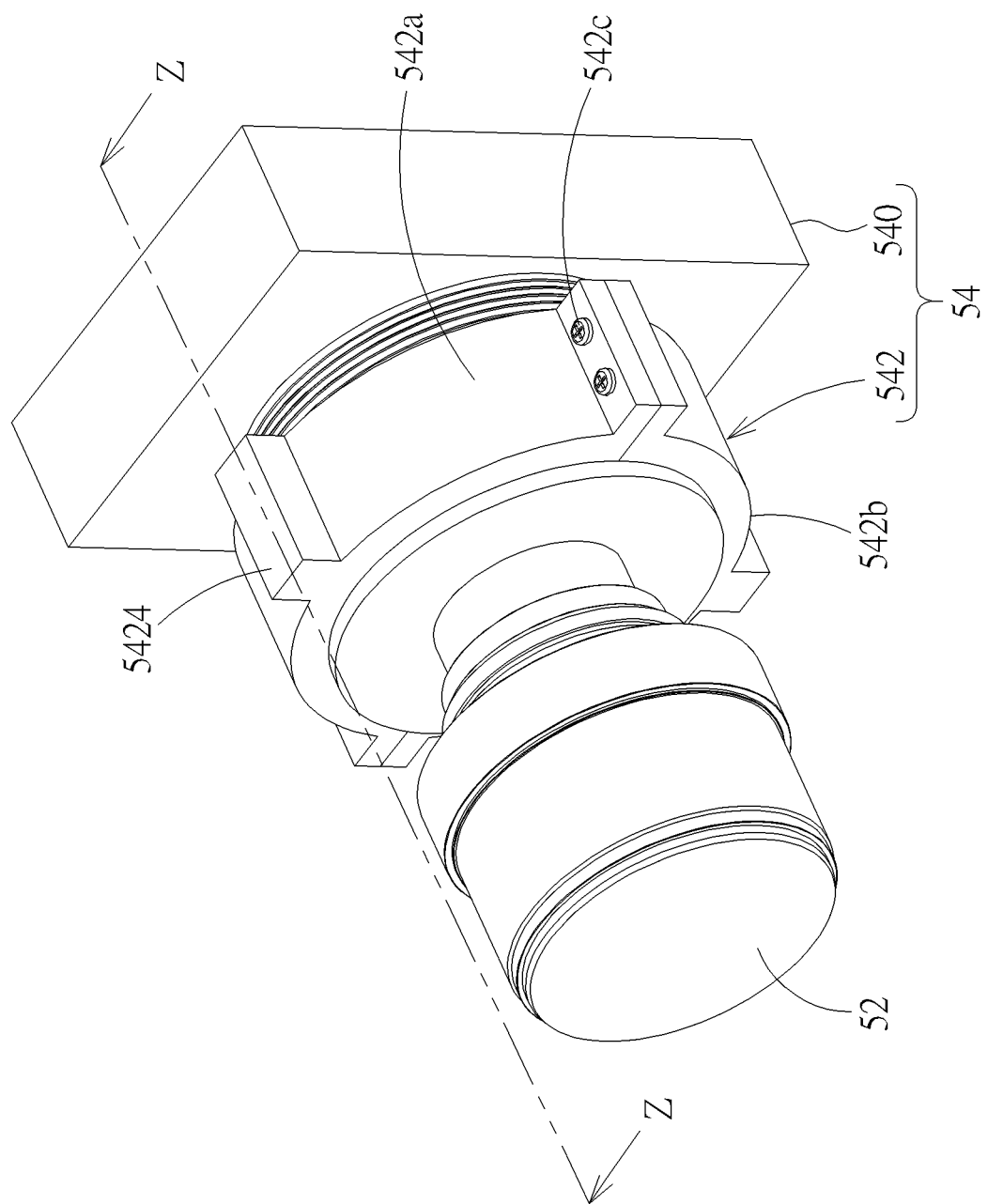
FIG. 9 is a perspective view illustrating a lens and a lens fixing module according to another embodiment of the invention.
Figure 10:
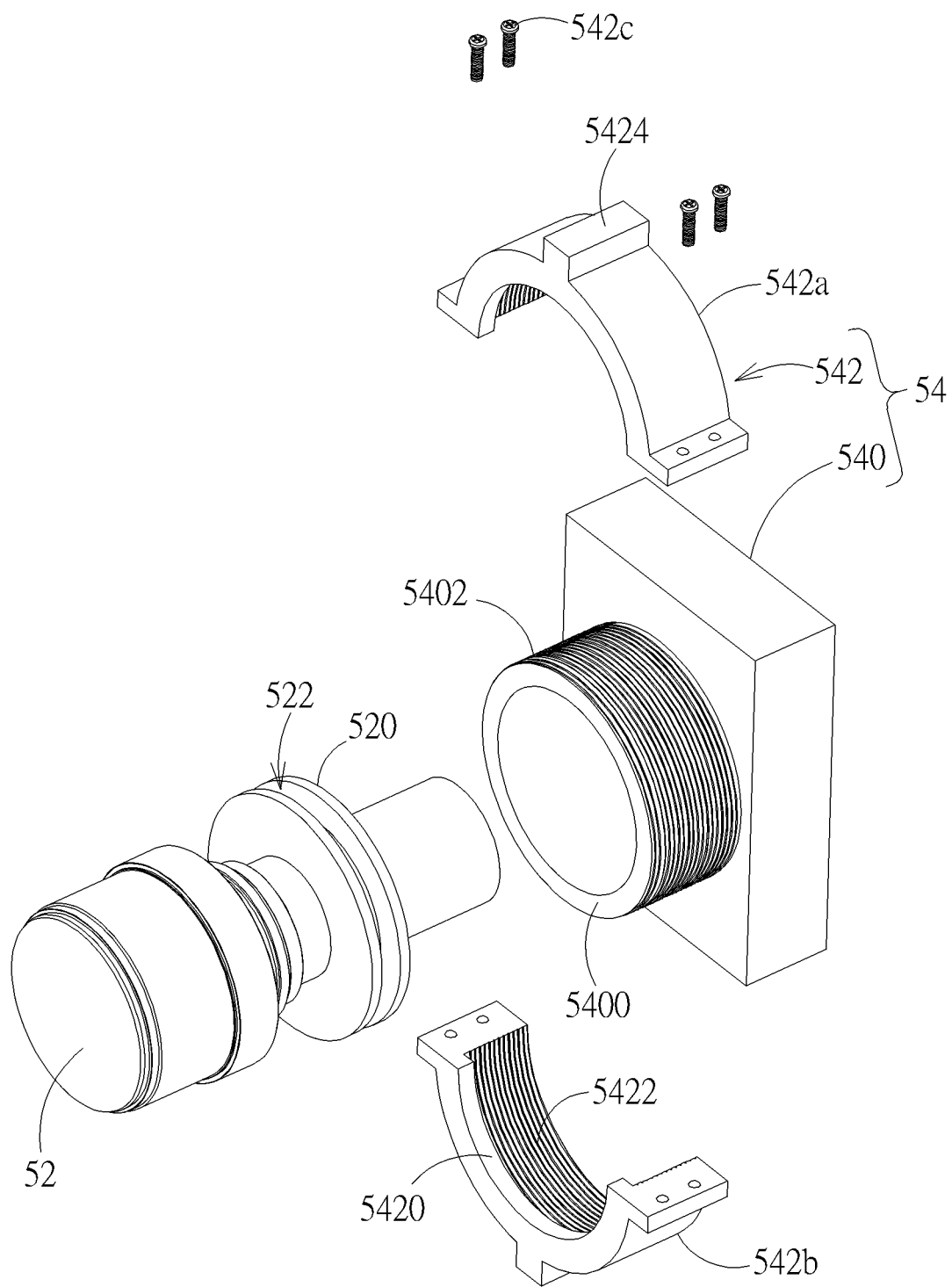
FIG. 10 is an exploded view illustrating the lens and the lens fixing module shown in FIG. 9.
Figure 11:
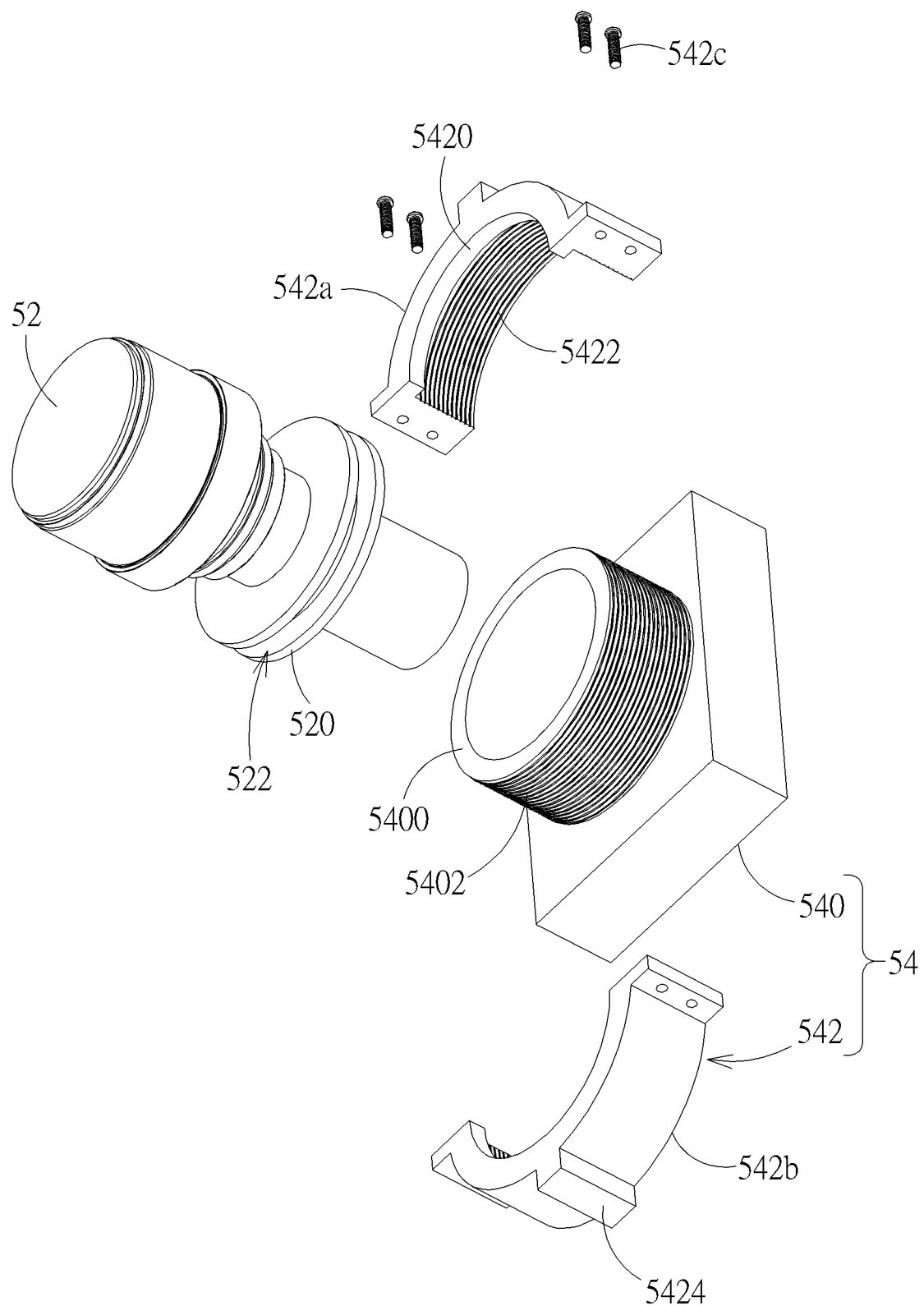
FIG. 11 is an exploded view illustrating the lens and the lens fixing module shown in FIG. 9 from another viewing angle.
Figure 12:
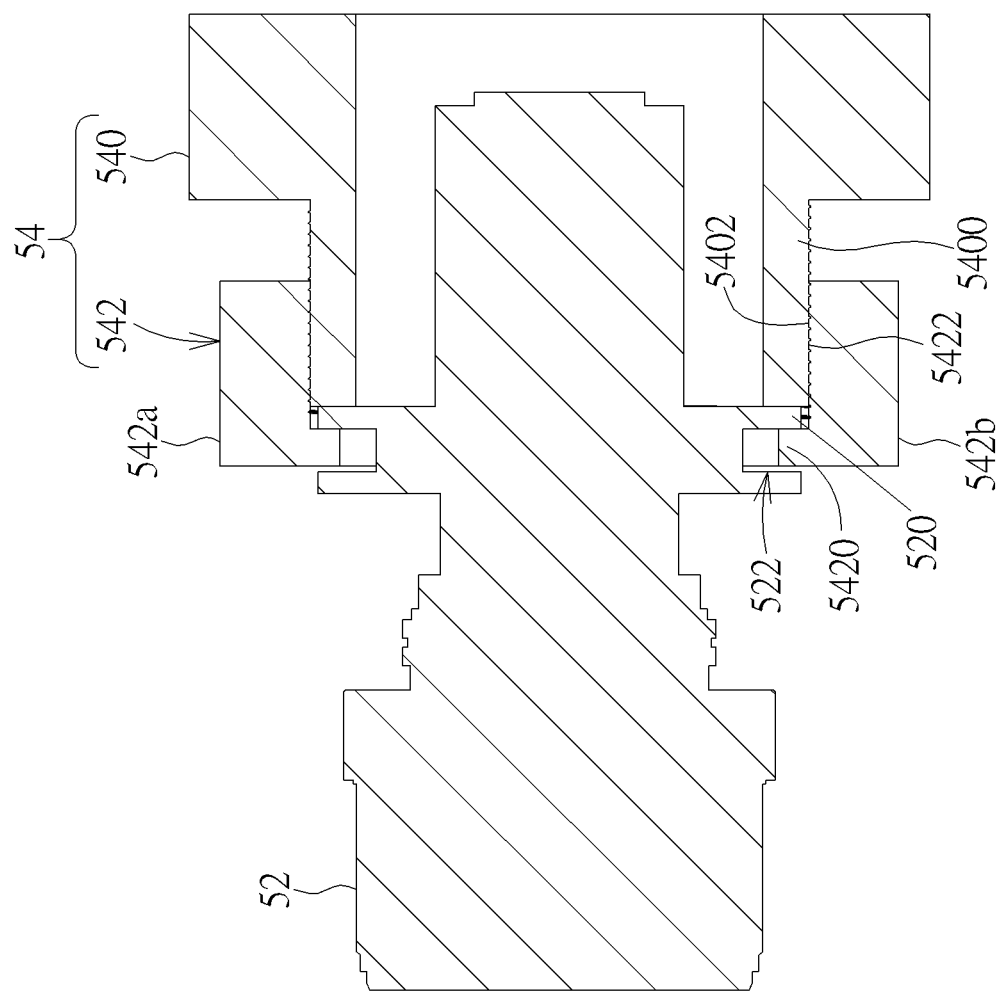
FIG. 12 is a sectional view illustrating the lens and the lens fixing module shown in FIG. 9 along line Z-Z.

Referring to FIGS. 9 to 12, FIG. 9 is a perspective view illustrating a lens 52 and a lens fixing module 54 according to another embodiment of the invention, FIG. 10 is an exploded view illustrating the lens 52 and the lens fixing module 54 shown in FIG. 9, FIG. 11 is an exploded view illustrating the lens 52 and the lens fixing module 54 shown in FIG. 9 from another viewing angle, and FIG. 12 is a sectional view illustrating the lens 52 and the lens fixing module 54 shown in FIG. 9 along line Z-Z.

As shown in FIGS. 9 to 12, the lens fixing module 54 comprises a fixing base 540 and a fixing ring 542. The fixing base 540 has a hollow pillar 5400 and a first connecting portion 5402. In this embodiment, the first connecting portion 5402 may be an outer thread outside the hollow pillar 5400. The fixing ring 542 comprises a first half ring 542a, a second half ring 542b and a t least one fixing member 542c. Each of the first half ring 542a and the second half ring 542b may have a restraining portion 5420 and a second connecting portion 5422. In this embodiment, the second connecting portion 5422 may be an inner thread inside the first half ring 542a and the second half ring 542b. Specifically, the outer thread (i.e. the first connecting portion 5402) is disposed on an outer wall of the hollow pillar 5400 and the inner thread (i.e. the second connecting portion 5422) is disposed on inner walls of the first half ring 542a and the second half ring 542b.

In this embodiment, the cross sections of the flange 520, the restraining portion 5420, the fixing ring 542 and the hollow pillar 5400 may be circular for assembly purpose. Specifically, an outer diameter of the flange 520 is larger than an inner diameter of the restraining portion 5420 and an inner diameter of the hollow pillar 5400, such that the flange 520 can be sandwiched in between the restraining portion 5420 of the fixing ring 542 and the hollow pillar 5400 of the fixing base 540.

The lens fixing module 54 is configured to fix the lens 52. In this embodiment, the lens 52 has a flange 520 and a recess 522, and an inner wall of the recess 522 comprises a first side wall and a second side wall, wherein a partial outer wall of the flange 520 is the first side wall of the recess 522. The aforesaid lens fixing module 14 may be replaced by the lens fixing module 54, wherein the fixing base 540 may be disposed in the casing 10 of the aforesaid projection device 1. When a user wants to fix the lens 52 to the lens fixing module 54, the user may insert an end of the lens 52 into the hollow pillar 5400 of the fixing base 540 first. When the end of the lens 52 is inserted into the hollow pillar 5400 of the fixing base 540, the user may oppositely dispose the first half ring 542a and the second half ring 542b to each other on the lens 52 and the hollow pillar 5400 in a radial direction of the lens 52 (i.e. the first half ring 542a and the second half ring 542b are disposed oppositely to each other on the lens 52 and the hollow pillar 5400), such that the restraining portion 5420 is located in the recess 522. Then, the user may use the fixing member 542c to fix the first half ring 542a and the second half ring 542b. At this time, the inner threads (i.e. the second connecting portions 5422) of the first half ring 542a and the second half ring 542b are aligned with each other. Then, the user may rotate the fixing ring 542 to connect the first connecting portion 5402 of the fixing base 540 to the second connecting portion 5422 of the fixing ring 542, such that the flange 520 of the lens 52 is sandwiched in between the restraining portion 5420 of the fixing ring 542 and the hollow pillar 5400 of the fixing base 540, as shown in FIG. 12. Accordingly, the lens 52 can be fixed on the lens fixing module 54 stably. Since the flange 520 of the lens 52 is tightly sandwiched in between the restraining portion 5420 of the fixing ring 542 and the hollow pillar 5400 of the fixing base 540, the lens fixing module 54 of the invention can support the lens 52 with heavy weight and large size. When the user wants to replace the lens 52, the user may detach the fixing member 542c first. Then, the user may separate the first half ring 542a and the second half ring 542b from each other to disconnect the second connecting portion 5422 from the first connecting portion 5402 of the fixing base 540. Then, the user can detach the lens 52 from the fixing base 540.

In other words, the user only needs to operate the fixing ring 542 to connect/disconnect the second connecting portion 5422 of the fixing ring 542 to/from the first connecting portion 5402 of the fixing base 540, such that the user can replace the lens 52 rapidly. In this embodiment, the outside of the fixing ring 542 may have at least one protruding portion 5424 or other uneven structures for facilitating the user to rotate the fixing ring 542. Furthermore, the fixing base 540 may be disposed on a movable platform (not shown), so as to adjust a displacement of the lens 52 by the movable platform.

As mentioned in the above, the invention utilizes the lens fixing module to fix the lens by the cooperation between the fixing base and the fixing ring. A user only needs to operate the fixing ring to connect/disconnect the second connecting portion of the fixing ring to/from the first connecting portion of the fixing base, such that the user can replace the lens rapidly. Furthermore, the lens fixing module of the invention can tightly sandwich the flange of the lens in between the restraining portion of the fixing ring and the hollow pillar of the fixing base. Accordingly, the lens fixing module of the invention can support the lens with heavy weight and large size. The lens fixing module of the invention not only can be operated conveniently but also has simple structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lens fixing module configured to fix a lens, the lens having a flange, the lens fixing module comprising:
a fixing base having a hollow pillar and a first connecting portion; and
a fixing ring having a restraining portion and a second connecting portion;
wherein an end of the lens is inserted into the hollow pillar, the fixing ring is disposed on the lens and the hollow pillar, and the first connecting portion is connected to the second connecting portion, such that the flange is sandwiched in between the restraining portion and the hollow pillar to fix the lens between the fixing ring and the hollow pillar.

2. The lens fixing module of claim 1, wherein the lens has a recess and a partial outer wall of the flange is an inner wall of the recess.

3. The lens fixing module of claim 2, wherein the fixing ring comprises a first half ring and a second half ring; when the end of the lens is inserted into the hollow pillar, the first half ring and the second half ring are disposed oppositely to each other on the lens and the hollow pillar in a radial direction of the lens, such that the restraining portion is located in the recess.

4. The lens fixing module of claim 3, wherein the fixing ring further comprises at least one fixing member and the at least one fixing member fixes the first half ring and the second half ring.

5. The lens fixing module of claim 1, wherein the first connecting portion is an outer thread outside the hollow pillar and the second connecting portion is an inner thread inside the fixing ring.

6. The lens fixing module of claim 1, wherein the first connecting portion is protruding pillar, the second connecting portion comprises an opening and an engaging recess, the opening communicates with the engaging recess, and the protruding pillar enters the engaging recess through the opening, such that the fixing ring is disposed on the hollow pillar.

7. A projection device comprising:
 a casing;
 a lens having a flange; and
 a lens fixing module comprising:
  a fixing base disposed in the casing, the fixing base having a hollow pillar and a first connecting portion; and
  a fixing ring having a restraining portion and a second connecting portion;
 wherein an end of the lens is inserted into the hollow pillar, the fixing ring is disposed on the lens and the hollow pillar, and the first connecting portion is connected to the second connecting portion, such that the flange is sandwiched in between the restraining portion and the hollow pillar to fix the lens between the fixing ring and the hollow pillar.

8. The projection device of claim 7, wherein the lens has a recess and a partial outer wall of the flange is an inner wall of the recess.

9. The projection device of claim 8, wherein the fixing ring comprises a first half ring and a second half ring; when the end of the lens is inserted into the hollow pillar, the first half ring and the second half ring are disposed oppositely to each other on the lens and the hollow pillar in a radial direction of the lens, such that the restraining portion is located in the recess.

10. The projection device of claim 9, wherein the fixing ring further comprises at least one fixing member and the at least one fixing member fixes the first half ring and the second half ring.

11. The projection device of claim 7, wherein the first connecting portion is an outer thread outside the hollow pillar and the second connecting portion is an inner thread inside the fixing ring.

12. The projection device of claim 7, wherein the first connecting portion is protruding pillar, the second connecting portion comprises an opening and an engaging recess, the opening communicates with the engaging recess, and the protruding pillar enters the engaging recess through the opening, such that the fixing ring is disposed on the hollow pillar.

\* \* \* \* \*